United States Patent

Makowecki

[11] Patent Number: 5,524,529
[45] Date of Patent: Jun. 11, 1996

[54] ROTARY STAMPER DISK

[75] Inventor: Walter Makowecki, Edmonton, Canada

[73] Assignee: 562186 Alberta Ltd., Edmonton, Canada

[21] Appl. No.: 530,958

[22] Filed: Sep. 20, 1995

[51] Int. Cl.$^6$ .................. A21C 9/00; A21C 9/06; A21C 11/00; A23P 1/00

[52] U.S. Cl. .................. 99/450.6; 99/353; 99/450.7; 425/133.1; 425/308

[58] Field of Search .............. 99/352–355, 450.1–450.8, 99/483, 484, 494; 426/283, 523, 503; 425/112, 131.1, 133.1, 307, 308

[56] References Cited

U.S. PATENT DOCUMENTS

| | | | |
|---|---|---|---|
| 3,603,270 | 9/1971 | Tangel | 99/450.6 |
| 3,615,675 | 10/1971 | Wisdom et al. | 99/450.7 |
| 3,858,497 | 1/1975 | Ishida | 99/450.6 |
| 4,025,260 | 5/1977 | Neel | 426/283 |
| 4,112,127 | 5/1978 | Popeil | 426/283 |
| 4,160,634 | 7/1979 | Huang | 425/112 |
| 4,363,614 | 12/1982 | Zaremba | 425/112 |
| 4,381,906 | 5/1983 | Mancini | 99/450.6 |
| 4,382,970 | 5/1983 | Sorensen | 426/275 |
| 4,469,475 | 9/1984 | Krysiak | 425/133.1 |
| 4,516,923 | 5/1985 | Lifshitz et al. | 99/450.6 |
| 4,574,690 | 3/1986 | Shiao et al. | 99/353 |
| 4,579,744 | 4/1986 | Thulin et al. | 426/283 |
| 4,618,499 | 10/1986 | Wainwright | 426/283 |
| 4,794,009 | 12/1988 | Dreisin | 426/283 |
| 4,848,218 | 7/1989 | Battaglia | 99/450.7 |
| 4,882,185 | 11/1989 | Simelunas et al. | 426/283 |
| 4,941,402 | 7/1990 | D'Alterio | 99/450 |
| 4,996,914 | 3/1991 | D'Alterio | 99/450 |
| 5,010,807 | 4/1991 | Anderson et al. | 99/450 |
| 5,216,946 | 6/1993 | Huang et al. | 99/353 |

FOREIGN PATENT DOCUMENTS

| | | | |
|---|---|---|---|
| 1043170 | 11/1978 | Canada | 107/12 |
| 1199528 | 1/1986 | Canada | 107/12 |
| 1218902 | 3/1987 | Canada | 107/24 |
| 1244288 | 11/1988 | Canada | 107/15 |
| 2008579 | 7/1990 | Canada | 99/90 |
| 2013569 | 9/1990 | Canada | 107/7 |
| 2029215 | 6/1991 | Canada | 99/191.4 |
| 2039802 | 10/1991 | Canada | 107/1 |
| 2068361 | 11/1992 | Canada | A23P 1/10 |
| 2088848 | 8/1993 | Canada | A21C 9/08 |
| 1818044 | 5/1993 | U.S.S.R. | A21C 9/06 |

Primary Examiner—Timothy F. Simone
Attorney, Agent, or Firm—Anthony R. Lambert

[57] ABSTRACT

A rotary stamper disk includes a disk having a first side, a second side, a rotational axis and a circumferential exterior mounting surface. A first circular plate is positioned on the first side of the disk. The first circular plate has a radius greater than the disk, thereby defining a first mounting flange that protrudes beyond the circumferential exterior mounting surface of the disk. A second circular plate is positioned on the second side of the disk. The second circular plate has a radius greater than the disk, thereby defining a second mounting flange that protrudes beyond the circumferential exterior mounting surface of the disk. A plurality of spacer members are positioned transversely at spaced intervals along the circumferential exterior mounting surface of the disk. Each of the spacer members has a first end and a second end. The first end of each of the plurality of spacer members is removably secured to the first mounting flange of the first circular plate. The second end of each of the plurality of spacer members is removably secured to the second mounting flange of the second circular plate.

5 Claims, 3 Drawing Sheets

ROTARY STAMPER DISK

FIELD OF THE INVENTION

The present invention relates to a rotary stamper disk and, in particular, a rotary stamper disk used in making filled food products.

BACKGROUND OF THE INVENTION

Rotary stamper disks have a circumferential row of stamping dies. As these rotary stamping dies rotate, they stamp out food products. U.S. Pat. No. 5,216,946 illustrates a rotary stamper disk used in the production of ravioli. This rotary stamper disks can only be used to produce one size of ravioli. This means that plants that produce a variety of different sizes of products, such as ravioli, must carry an inventory of rotary stamper disks with differing sizes of stamping dies. It also means that a new rotary stamper disk must be acquired every time an order is received for a new size of product.

SUMMARY OF THE INVENTION

What is required is a rotary stamper disk that is capable of being reconfigured to produce different sizes of product.

According to the present invention there is provided a rotary stamper disk, which includes a disk having a first side, a second side, a rotational axis and a circumferential exterior mounting surface. A first circular plate is positioned on the first side of the disk. The first circular plate has a radius greater than the disk, thereby defining a first mounting flange that protrudes beyond the circumferential exterior mounting surface of the disk. A second circular plate is positioned on the second side of the disk. The second circular plate has a radius greater than the disk, thereby defining a second mounting flange that protrudes beyond the circumferential exterior mounting surface of the disk. A plurality of spacer members are positioned transversely at spaced intervals along the circumferential exterior mounting surface of the disk. Each of the spacer members has a first end and a second end. Means is provided for removably securing the first end of each of the plurality of spacer members to the first mounting flange of the first circular plate, and for removably securing the second end of each of the plurality of spacer members to the second mounting flange of the second circular plate.

The rotary stamper disk, as described above, can easily be reconfigured by merely moving the spacer members. There are a number of different ways to secure the spacer members between the mounting flanges. The preferred way is by means of a male to female engagement as between pins and mounting grooves. With this manner of attachment a first circumferential groove is positioned in an interior face of the first mounting flange and a second circumferential groove is positioned in an interior face of the second mounting flange. The first circumferential groove and the second circumferential groove are positioned in parallel spaced relation. Each of the spacer members having a first pin positioned in the first end and a second pin positioned in the second end. The first pin extends into the first circumferential groove in the first mounting flange and the second pin extends into the second circumferential groove in the second mounting flange, thereby locking the spacer member in position against the circumferential exterior mounting surface of the disk between the first circular plate and the second circular plate.

Although the rotary stamper disk, as described above, could be reconfigured by removing one of the circular plates, it is preferred that a quick release system be provided to speed up the process of reconfiguring the rotary stamper disk. Even more beneficial results may, therefore, be obtained when the said first pin is positioned in an axial bore at the first end of the spacer member and the second pin is positioned in an axial bore at the second end of the spacer member. The first pin is movable within the axial bore at the first end of the spacer member between positions extended from and retracted within the axial bore. The second pin is movable within the axial bore at the second end of the spacer member between positions extended from and retracted within the axial bore. Means are provided for moving the first pin and the second pin between their extended and retracted positions.

There are a variety of means for moving the pins between their extended and retracted positions. The means that is preferred involves utilizing a spacer member that has a single axial bore extending between the first end and the second end in which are disposed the first pin and the second pin in end to end relation when the pins are in the retracted position within the single axial bore. A transverse bore is provided to receive a wedge member. The transverse bore intersects the single axial bore such that when the wedge member is inserted into the transverse bore, the wedge member passes between the first pin and the second pin pushing them apart such that they move along the axial bore into the extended position.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
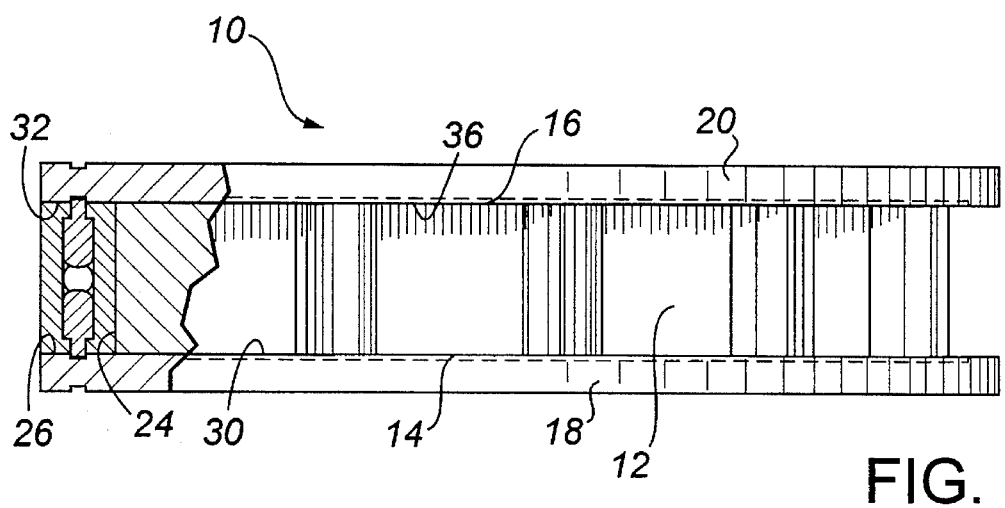
FIG. 1 is a front elevation view of a rotary stamper disk constructed in accordance with the teachings of the present invention.

The preferred embodiment, a rotary stamper disk generally identified by reference numeral 10, will now be described with reference to FIGS. 1 through 6.

Figure 2:
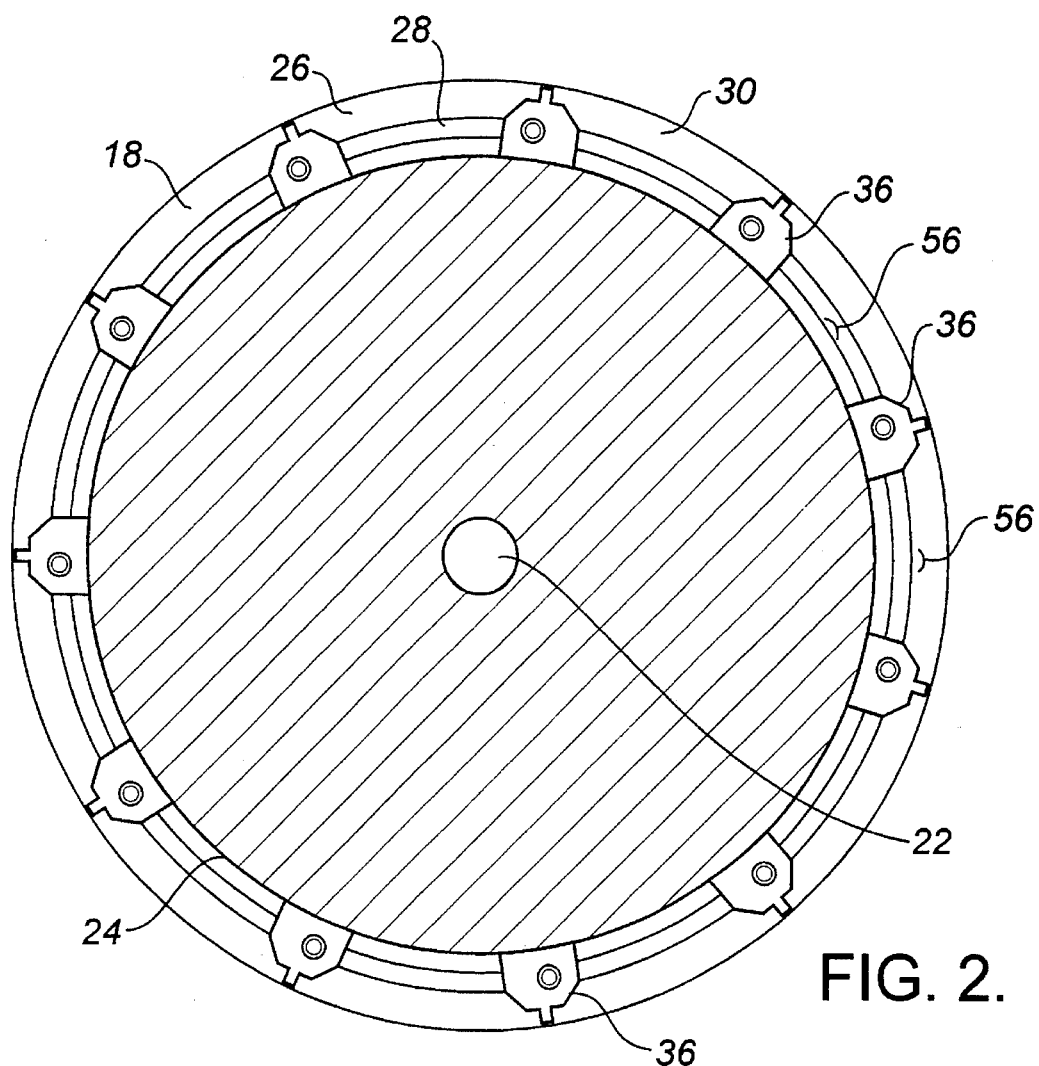
FIG. 2 is a side elevation view in section of the rotary stamper disk illustrated in FIG. 1.
Figure 3:
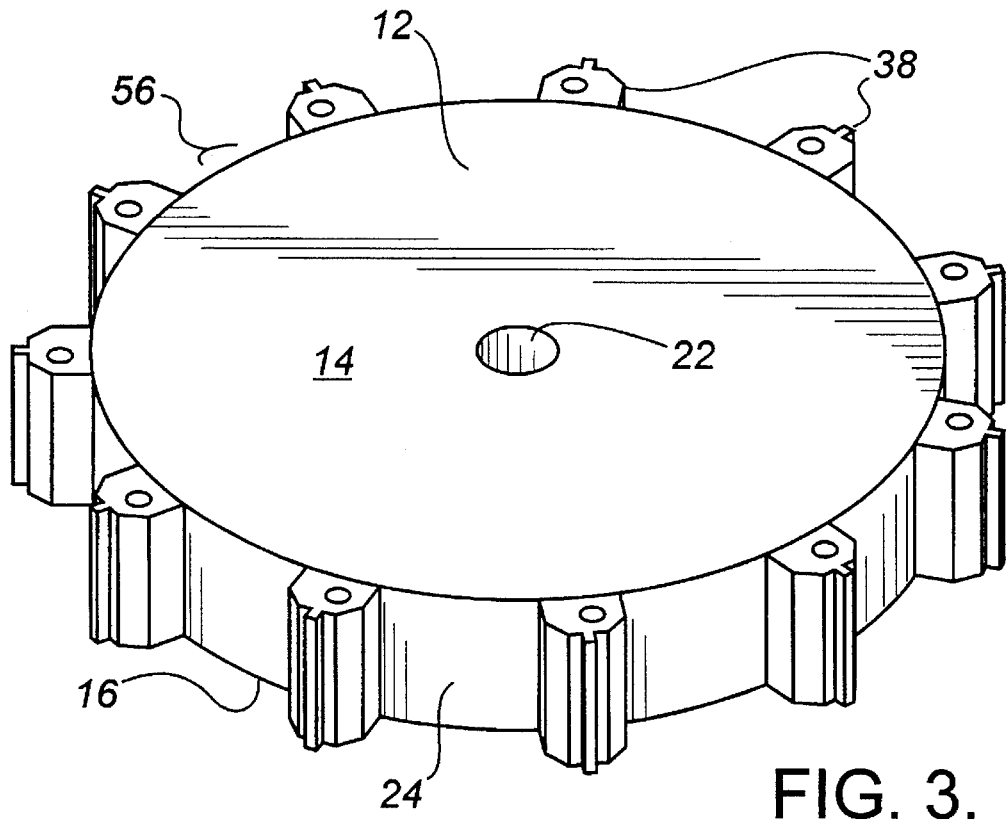
FIG. 3 is a perspective view of a disk component of the rotary stamper disk illustrated in FIG. 1.
Figure 4:
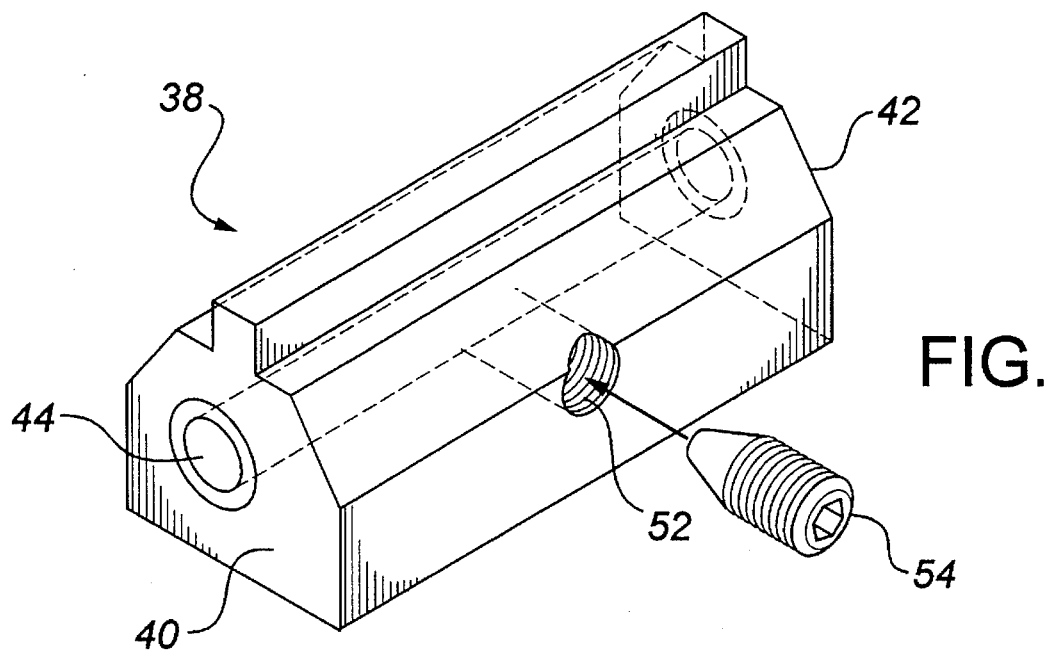
FIG. 4 is a perspective view of a spacer component of the rotary stamper disk illustrated in FIG. 1.
Figure 5:
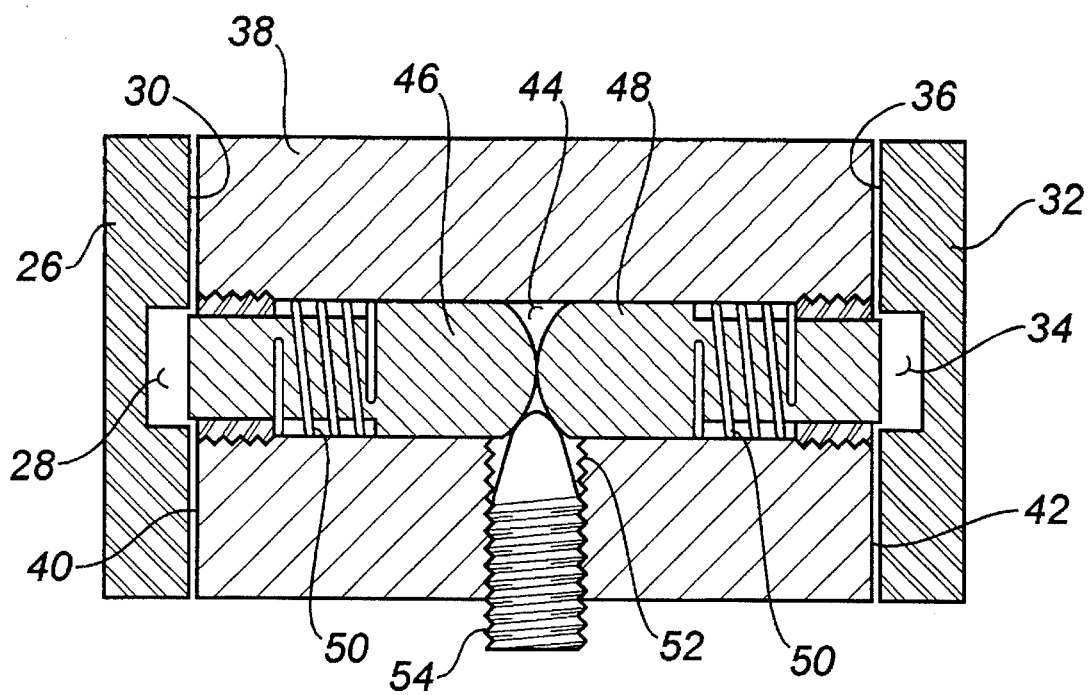
FIG. 5 is a detailed front elevation view of the pins used to lock the spacer component to the rotary stamper disk, the pins being in a retracted position.
Figure 6:
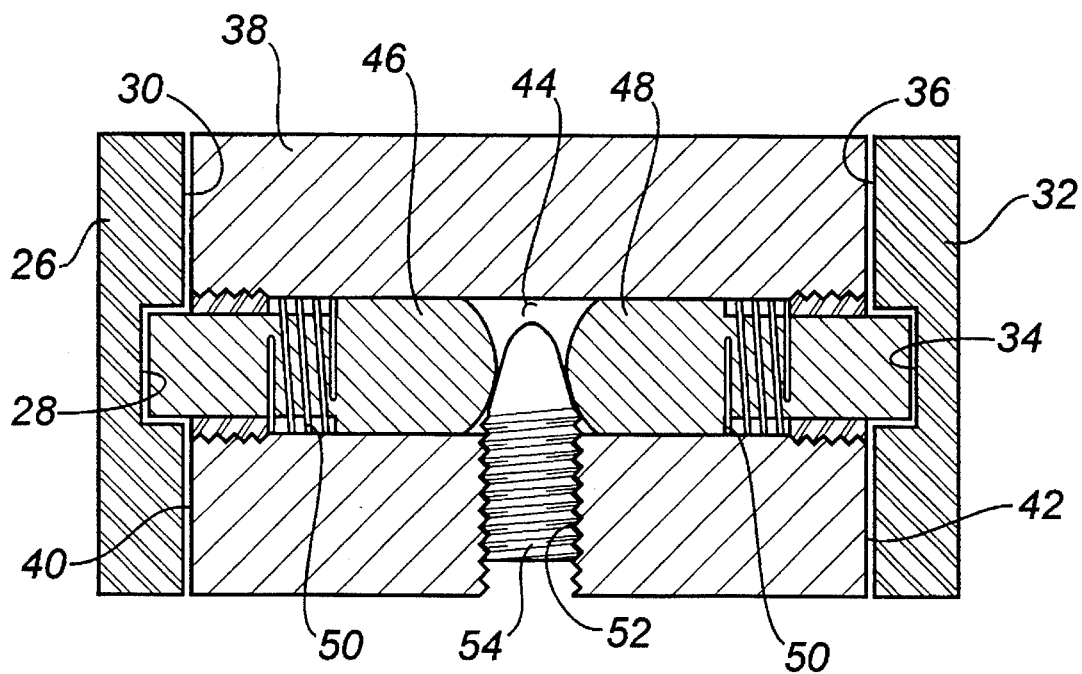
FIG. 6 is a detailed front elevation view of the pins used to lock the spacer component to the rotary stamper disk, the pins being in an extended position.

Referring to FIG. 1, rotary stamper disk 10 includes a central disk body 12 having a first side 14 and a second side 16. A first circular plate 18 is positioned on first side 14 of disk 12. A second circular plate 20 is positioned on second side 16 of disk 12. Referring to FIGS. 2 and 3, disk 12 has a rotational axis defined by shaft receiving aperture 22 and a circumferential exterior mounting surface 24. Referring to FIGS. 1 and 2, first circular plate 18 has a radius greater than disk 12. This difference in radius defines a first mounting flange 26 that protrudes beyond circumferential exterior mounting surface 24 of disk 12. A first circumferential groove 28 is positioned in an interior face 30 of first mounting flange 26. Second circular plate 20 similarly has a radius greater than disk 12. This difference in radius defines a second mounting flange 32 that protrudes beyond circumferential exterior mounting surface 24 of disk 12. A second circumferential groove 34 is positioned in an interior face 36 of second mounting flange 32. Referring to FIGS. 1, 5, and 6, first circumferential groove 28 and second circumferential groove 34 are in parallel spaced relation. Referring to FIGS. 1 through 3, a plurality of spacer members 38 are positioned transversely at spaced intervals along circumferential exterior mounting surface 24 of disk 12. Referring to FIG. 4, each of spacer members 38 has a first end 40, a second end 42, and a single axial bore 44 extending between first end 40 and second end 42. Referring to FIGS. 5 and 6, a first pin 46 is positioned in single axial bore 44 at first end 40 of each spacer member 38. A second pin 48 is positioned in single axial bore 44 at second end 42 of spacer member 38. First pin 46 is movable between an extended position illustrated in FIG. 6 and a retracted position illustrated in FIG. 5. Referring to FIG. 5, in the retracted position first pin 46 is retracted within single axial bore 44 at first end 40 of spacer member 38. Referring to FIG. 6, in the extended position first pin 46 extends from first end 40 of spacer member 38. Second pin 48 is similarly movable between an extended illustrated in FIG. 6 and a retracted position illustrated in FIG. 5. Referring to FIG. 5, in the retracted position second pin 48 is retracted within single axial bore 44 at second end 42 of spacer member 38. Referring to FIG. 6, in the extended position second pin 48 extends from second end 42 of spacer member 38. Referring to FIGS. 5 and 6, first pin 46 and second pin 48 are biased into a normally retracted position by biasing springs 50. Referring to FIG. 4, a threaded transverse bore 52 is provided that intersects single axial bore 44 intermediate first end 40 and second end 42 of spacer member 38. A screw-form wedge member 54 is threadedly engaged in transverse bore 52.

The use and operation of rotary stamper disk 10 will now be described with reference to FIGS. 1 through 6. Referring to FIGS. 1 through 3, dough receiving stamping cavities 56 are provided between spacer members 38. The size of these dough receiving stamping cavities 56 is governed by the shape and relative positioning of spacer members 38. As previously described, first pin 46 and second pin 48 are normally maintained in their retracted positions by biasing springs 50. This enables spacer member 38 to be inserted into the desired mounting position, as illustrated in FIG. 5. Once in the desired position wedge member 54 is inserted into transverse bore 52. As illustrated in FIG. 6, wedge member 54 passes between first pin 46 and second pin 48 pushing them apart such that they move along single axial bore 44 into the extended position. In the extended position, first pin 46 engages first circumferential band 28 in first mounting flange 26. In the extended position, second pin 48 engages second circumferential groove 34 in second mounting flange 32. It can, therefore, been seen that when first pin 46 and second pin 48 are both in the extended position spacer member 38 is effectively locked in position against circumferential exterior mounting surface 24 of disk 12 between first circular plate 18 and second circular plate 20.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A rotary stamper disk, comprising:
   a disk having a first side, a second side, a rotational axis and a circumferential exterior mounting surface;
   a first circular plate positioned on the first side of the disk, the first circular plate having a radius greater than the disk, thereby defining a first mounting flange that protrudes beyond the circumferential exterior mounting surface of the disk;
   a second circular plate positioned on the second side of the disk, the second circular plate having a radius greater than the disk, thereby defining a second mounting flange that protrudes beyond the circumferential exterior mounting surface of the disk;
   a plurality of spacer members positioned transversely at spaced intervals along the circumferential exterior mounting surface of the disk, each of the spacer members having a first end and a second end;
   means for removably securing the first end of each of the plurality of spacer members to the first mounting flange of the first circular plate, and for removably securing the second end of each of the plurality of spacer members to the second mounting flange of the second circular plate.

2. The rotary stamper disk as defined in claim 1, wherein a first circumferential groove is positioned in an interior face of the first mounting flange, a second circumferential groove is positioned in an interior face of the second mounting flange, the first circumferential groove and the second circumferential groove being in parallel spaced relation, each of the spacer members having a first pin positioned in the first end and a second pin positioned in the second end, the first pin extending into the first circumferential groove in the first mounting flange and the second pin extending into the second circumferential groove in the second mounting flange, thereby locking the spacer member in position against the circumferential exterior mounting surface of the disk between the first circular plate and the second circular plate.

3. The rotary stamper disk as defined in claim 2, wherein the said first pin is positioned in an axial bore at the first end of the spacer member and the second pin is positioned in an axial bore at the second end of the spacer member, the first pin being movable within the axial bore at the first end of the spacer member between positions extended from and retracted within the axial bore, the second pin being movable within the axial bore at the second end of the spacer member between positions extended from and retracted within the axial bore, means is provided for moving the first pin and the second pin between their extended and retracted positions.

4. The rotary stamper disk as defined in claim 2, wherein the spacer member has a single axial bore extending between the first end and the second end in which are disposed the first pin and the second pin in end to end relation when the pins are in a retracted position within the single axial bore, a transverse bore being provided to receive a wedge member, the transverse bore intersecting the single axial bore such that when the wedge member is inserted into the transverse bore the wedge member passes between the first pin and the second pin pushing them apart such that they move along the axial bore into an extended position.

5. A rotary stamper disk, comprising:
   a disk having a first side, a second side, a rotational axis and a circumferential exterior mounting surface;
   a first circular plate positioned on the first side of the disk, the first circular plate having a radius greater than the disk, thereby defining a first mounting flange that protrudes beyond the circumferential exterior mounting surface of the disk, the first mounting flange having an interior face with a first circumferential groove;

a second circular plate positioned on the second side of the disk, the second circular plate having a radius greater than the disk, thereby defining a second mounting flange that protrudes beyond the circumferential exterior mounting surface of the disk, the second mounting flange having an interior face with a second circumferential groove, the first circumferential band and the second circumferential band being in parallel spaced relation;

a plurality of spacer members positioned transversely at spaced intervals along the circumferential exterior mounting surface of the disk, each of the spacer members having a first end, a second end, and a single axial bore extending between the first end and the second end;

a first pin is positioned in the single axial bore at the first end of each spacer member, a second pin is positioned in the single axial bore at the second end of the spacer member, the first pin being movable between an extended and retracted position, in the retracted position the first pin being retracted within the axial bore at the first end of the spacer member and in the extended position the first pin extending from the first end of the spacer member, the second pin being movable between an extended and retracted position, in the retracted position the second pin being retracted within the single axial bore at the second end of the spacer member and in the extended position the second pin extending from the second end of the spacer member;

a threaded transverse bore being provided that intersects the single axial bore intermediate the first end and the second end of the spacer member;

a screw-form wedge member threadedly engaged in the transverse bore, such that when the wedge member is inserted into the transverse bore the wedge member passes between the first pin and the second pin pushing them apart causing them to move along the single axial bore into the extended position until the first pin engages the first circumferential groove in the interior face of the first mounting flange and the second pin engages the second circumferential groove in the interior face of the second mounting flange, thereby locking the spacer member in position against the circumferential exterior mounting surface of the disk between the first circular plate and the second circular plate.

* * * * *